United States Patent Office 3,472,858
Patented Oct. 14, 1969

3,472,858
DISTINCT RACEMATES OF 2-HYDROXY-2-
ETHYL - 1,2,3,4,6,7 - HEXAHYDRO - 11bH-
BENZO[a] QUINOLIZINE
Richard Unger, Darmstadt, Germany, assignor to
E. Merck A.G., Darmstadt, Germany
No Drawing. Filed Mar. 17, 1966, Ser. No. 535,040
Claims priority, application Germany, Mar. 17, 1965,
M 64,552
Int. Cl. C07d 33/08
U.S. Cl. 260—286     2 Claims

ABSTRACT OF THE DISCLOSURE

Separating two racemates of 2-hydroxy-2-ethyl-1,2,3,4,6,7-hexahydro-11bH-benzo[a]quinolizine, by:
(a) reacting a mixture of said two racemates with malonic acid to form a mixture of hydrogen malonates thereof;
(b) contacting said resulting mixture of hydrogen malonates with acetone, methanol, ethanol, isopropanol, or butanone for keeping one of said racemates in the dissolved state and allowing the other of said racemates to crystallize out; and
(c) separating crystallized racemates from dissolved racemate, said racemates being strong central nervous system depressants.

---

This invention relates to two distinct racemates of 2-hydroxy-2-ethyl - 1,2,3,4,6,7 - hexahydro - 11bH - benzo[a]-quinolizine (I), particularly to an improved process of separating such racemates from each other, and more particularly to the discovery of an enhanced therapeutic activity for one of said racemates.

As disclosed in copending application Ser. No. 472,731, filed July 16, 1965, now Patent 3,393,198 issued July 16, 1968 having a common inventor and common assignee, compound I, 2-hydroxy - 2 - ethyl-1,2,3,4,6,7-hexahydro-11bH-benzo[a]quinolizine can be prepared in the form of a mixture of both possible racemates by the reaction of 2 - oxo - 1,2,3,4,6,7-hexahydro-11bH-benzo[a]quinolizine (compound II) with ethyllithium or ethylmagnesium halogenides. The separation of these racemates can be effected by first obtaining the hydrochloride of the less readily soluble racemate ("Racemate A") and from its mother liquor the hydrobromide of the more readily soluble racemate ("Racemate B").

Unfortunately, however, the precedingly described method for the preparation of the hydrobromide of Racemate B is not completely satisfactory with larger batches. In particular, pure Racemate B could only be obtained by the aid of supplementary chromatographic purification. Attempts to obtain pure Racemate B in a simpler manner by way of the sulfate, methanesulfonate, ethanesulfonate, salicylate, oxalate, succinate, glutarate, fumarate, maleate, benzoate, tartrate, or picrate were also unsatisfactory.

An object of this invention, therefore, is to provide an improved process for the preparation of Racemate B, particularly a process which is amenable to commercial production.

Another object is to provide novel intermediates which are formed in the preparation of the two racemates of uniform structure.

Still further objects include pharmaceutical compositions and methods of use, based on Racemate B.

Upon further study of the specification and claims, other objects and advantages of the present invention will become apparent.

To attain these objects, a process is provided whereby it was surprisingly discovered that Racemate B can be separated easily on a large scale and in a purer form from a mixture of the raw bases—which is, for instance, obtained by the reaction of II with ethyllithium—by adding malonic acid to the mixture of raw bases and separating the mixture obtained in a suitable solvent, whereupon the hydrogen malonate of Racemate B is crystallized out after a short period. The hydrogen malonate of Racemate A can also be obtained in amorphous form from the mother liquor. The salts obtained can be converted in the usual manner to the corresponding free bases and these, in turn, can be converted to other physiologically compatible acid addition salts or quaternary ammonium salts.

Another aspect of this invention is the discovery that although Racemate B and Racemate A have approximately the same toxicity, they unexpectely exhibit widely different therapeutic potencies. Racemate B, in particular, exhibits a strong depressant effect on the central nervous system (narcosis-potentiating, sedative, tranquilizing, neuroleptic and thymoanaleptic), whereby Racemate B is about 5 to 6 times more effective than Racemate A, as has been proved by animal experiments. (The word neuroleptic means a specific effect on the CNS as defined by Haase and Janssen, for example, in "The action of neuroleptic drugs" (1965), North-Holland-Publishing Company, Amsterdam.) The following values with respect to efficaciousness are obtained for example from oral administration to female rats by the hexobarbital narcosis test, meprobamate being used as the standard.

| 2-hydroxy-2-ethyl-hexahydro-11bH-benzo[a]quinolizine | Effect, based on meprobamate=1 |
|---|---|
| Racemate B | 2 |
| Racemate A | 10 |

In the hexobarbital narcosis test, groups of 10 female rates (weight 130–280 g.) receive, after 20 hours of fasting, graded quantities of the test substances (suspended in gum arabic solution) by oral administration. A group of 10 control animals simultaneously receives orally a 5% gum arabic solution. After 45 minutes, all animals receive intravenously hexobarbital sodium (20 mg./kg.). The animals are positioned on their backs on heated troughs. The duration of narcosis of the animals is determined with the aid of two criteria (head raising and turning from supine to prone position) and compared. The minimally effective dosage of the test substances is defined as the lowest dosage at which a marked difference in effectiveness occurs with respect to the control animals (statistical assurance by means of the Mann-Whitney test).

With respect to the process for separating the racemates, a starting mixture of raw bases of both racemates can be used as such, or preferably, as dissolved in an inert organic solvent. Thus, it is expedient not to isolate the mixture of bases but to use the resultant organic solution obtained by the reactions of compound II with the corresponding organometallic compounds and subsequent hydrolysis. For such purposes, inert organic solvents are used, such as, for example, diethyl ether, diisopropyl ether, tetrahydrofuran, dioxane, anisole, or benzene, toluene, xylene, or aliphatic hydrocarbons, or even mixtures of two or more of these solvents.

The malonic acid can be added in solid form or in solution wherein preferably either the above-mentioned solvents, or methanol, ethanol, isopropanol, acetone, or butanone are used. An amount of at least one mol of malonic acid per mol of racemate mixture has to be applied. Preferably a stoichiometric excess of malonic acid is employed, for example until a pH-value of 3–4 is reached in the solution.

Fundamental to the separation of the racemates is the utilization of a selective solvent which keeps the resultant hydrogen malonate of Racemate A in solution and permits the resultant hydrogen malonate of Racemate B to crystallize out. Such solvents include, for example, lower alcohols such as methanol, ethanol, isopropanol, or butanone, and preferably acetone. It is to be understood, however, that this invention is not intended to be limited to the preceding specifically named solvents. Once a chemist is aware of the fact that a selective solvent can be used, it is merely routine testing to use other functionally equivalent solvents which are listed in handbooks and the like. Thus, any list of possible other solvents could not be all-inclusive.

As a matter of preferred practice, the mixed hydrogen malonate racemates are precipitated from the mixture. The resultant precipitate is separated and then dissolved in acetone, methanol, ethanol, isopropanol, or butanone at a temperature between about room temperature and the boiling temperature of the solvent preferably with warming to about a temperature between 50° C. and the boiling temperature and allowed to crystallize on standing.

Alternatively, the bases obtained through the organometallic reaction can be isolated, dissolved in a selective solvent, e.g., methanol, ethanol, isopropanol, or butanone, and the solution thus obtained mixed with malonic acid while warm so that the hydrogen malonate of Racemate B crystallizes. The resultant crystalline hydrogen malonate of Racemate B is practically pure and after a single recrystallization can be put directly to pharmaceutical use; it melts at 158° C.

There is a characteristic difference between the migration velocity of Racemate B and that of Racemate A in thin layer chromatographic analysis on silica gel. Using a solvent mixture benzene/diethylamine (10:1) a proportion of the RF-values of Racemate A to Racemate B of about 0.7:1 results.

The conversion of the hydrogen malonate to the free bases can, if desired, be effected in the usual way. Thus, for example, an aqueous solution of the salts can be mixed with a solution of caustic soda, caustic potash, or sodium carbonate; and the resultant bases can be extracted from the mixture with ether, benzene, chloroform, or similar inert organic solvents.

Each of the racemates obtained by the process according to this invention can also be converted in the usual manner to the other acid addition salts by treatment with an acid. The acids used for this reaction are those which yield physiologically compatible salts. Thus, it is possible to use organic and inorganic acids, such as aliphatic, alicyclic, araliphatic, aromatic, or heterocyclic, mono- or polybasic carboxylic or sulfonic acids like formic acid, acetic acid, propionic acid, pivalic acid, diethylacetic acid, oxalic acid, succinic acid, glutaric acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, isonicotinic acid, methanesulfonic acid, ethanedisulfonic acid, β - hydroxyethanesulfonic acid, p - toluenesulfonic acid, naphthalenemono- and -disulfonic acid, sulfuric acid, nitric acid, hydrohalic acids, such as hydrochloric acid or hydrobromic acid, or phosphoric acids like orthophosphoric acid.

Through treatment with alkylation agents containing up to 8 carbon atoms, preferably methyl iodide, dimethyl sulfate or ethyl halogenides, the racemates obtained may be converted to the corresponding physiologically compatible quaternary ammonium compounds.

The racemates of this invention can be used in admixture with conventional pharmaceutical excipients. The excipients will be organic or inorganic substances suitable for parenteral, enteral, or topical application and which do not react with the new compounds, for example water, vegetable oils, polyethylene glycols, gelatin, lactose, starch, magnesium stearate, talc, petroleum jelly, or cholesterol. Solutions, more particularly oily or aqueous solutions, and suspensions, emulsions, or implants will preferably be used for parenteral application. For enteral application it is also possible to use tablets, dragees, or sweetened liquid vehicles, which may or may not be sterilized or mixed with additives, such as preservatives, stabilizers, or wetting agents, or salts for influencing osmotic pressure, or buffer substances.

The substances according to the invention are preferably administered in a dosage from 1 to 100 mg. per dosage unit. The preferred effective daily dose lies between about 10 mg. and 150 mg. of active substance.

Without further elaboration, it is believed that one skilled in the art can, using the preceding description, utilize the present invention to its fullest extent. The following preferred specific embodiments are, therefore, to be construed as merely illustrative, and not limitative of the remainder of the specification in any way whatsoever.

EXAMPLE 1

Sufficient ethereal malonic acid solution is added to a solution of 2-hydroxy-2-ethyl-1,2,3,4,6,7-hexahydro-11bH-benzo[a]quinolizine in ether/tetrahydofuran to give a pH of 3–4. When the precipitated hydrogen malonate has settled, the solution is decanted and the residue is refluxed with 500 ml. of acetone, for 5 minutes. The amorphous residue is thereby dissolved and the hydrogen malonate of Racemate B crystallizes out. 70 g. of hydrogen malonate (M.P. 158° C.) is obtained. The product is uniform when examined by thin layer chromatography. It can be recrystallized from ethanol or acetone without any change in the melting point. The free base obtained from the hydrogen malonate does not crystallize; it boils at 148–149° C./0.05 mm., and on standing, slowly turns red. The hydrobromide melts at 204° C. (from isopropanol).

The lesser neuroleptically effective Racemate A can be obtained from the acetone mother liquor of the hydrogen malonate. To this end the acetone is distilled off, the amorphous residue treated with dilute caustic soda solution and ether, and the ether phase is then separated. The aqueous phase is extracted twice more with ether and the combined ether layers dried with magnesium sulfate. The residue remaining after evaporation of the ether solution is triturated with 150 ml. cyclohexane, causing Racemate A to crystallize out. 83 g. of the base (M.P. 106° C.) is obtained. The hydrochloride and hydrobromide are prepared in the usual manner. After recrystallization from ethanol the hydrochloride melts at 225° C., the hydrobromide at 207° C.

Preparation of the starting solution 14 g. of finely divided lithium metal are added to 250 ml. of absolute ether. Dry nitrogen is bubbled slowly through the reaction vessel and 124 g. of ethyl bromide in 400 ml. of absolute ether is added dropwise with stirring at −10° C.; stirring is continued at the same temperature until the lithium is completely dissolved. A solution of 150 g. of 2-oxo-1,2,3,4,6,7-hexahydro-11bH-benzo[a]-quinolizine in 600 ml. of absolute ether and 100 ml. of absolute tetrahydrofuran is then slowly added with agitation at −10° C. The temperature of the mixture is then allowed to rise to room temperature; the mixture is agitated for 30 minutes and then refluxed for 3 hours. On cooling, water is slowly added; the resultant organic layer is separated and dried over magnesium sulfate.

The following examples are such for pharmaceutical preparations.

(I) Tablets with dividing groove.—Each tablet contains:

| | Mg. |
|---|---|
| Crystalline racemate B of hydrogen malonate of 2-hydroxy-2-ethyl-1,2,3,4,6,7-hexahydro-11bH-benzo[a]-quinolizine (F. 158° C.) | 25 |
| Lactose | 150 |
| Corn starch | 20 |
| Talc | 8 |
| Magnesium stearate | 2 |

(II) Coated Tablets.—Each coated tablet contains:

| | Mg. |
|---|---|
| Crystalline racemate B of hydrogen malonate of 2-hydroxy-2-ethyl-1,2,3,4,6,7-hexahydro-11bH-benzo[a]-quinolizine (F. 158° C.) | 10 |
| Lactose | 120 |
| Corn starch | 12 |
| Talc | 6 | and additionally a coating consisting of a mixture of corn starch, sugar, talc, and tragacanth.

(III) Injection solution

Each ampoule contains a solution of 10 mg. of crystalline racemate B of hydrogen malonate of 2-hydroxy-2-ethyl-1,2,3,4,6,7-hexahydro-11bH - benzo[a]-quinolizine (F. 158° C.) in 5 ml. of distilled water.

(IV) Drops 2,5 g. each of methyl and propyl p-hydroxybenzoate are dissolved in 5 l. of hot distilled water. After cooling, 1 g. of saccharin sodium salt and 50 g. of crystalline racemate B of hydrogen malonate of 2-hydroxy-2-ethyl-1,2,3,4,6,7 - hexahydro - 11bH - benzo[a]-quinolizine (F. 158° C.) are added. The solution is filled into appropriate bottles. The average dosage to be administered is 20 drops (about 10 mg. of the active ingredient).

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for separating two racemates of 2-hydroxy - 2 - ethyl - 1,2,3,4,6,7 - hexahydro - 11bH - benzo[a]-quinolizine, which process comprises:
    (a) reacting a mixture of said two racemates with malonic acid to form a mixture of hydrogen malonates thereof;
    (b) contacting said resultant mixture of hydrogen malonates with a solvent selected from the group consisting of acetone, methanol, ethanol, isopropanol, and butanone for keeping one of said racemates in the dissolved state and allowing the other of said racemates to crystallize out; and
    (c) separating crystallized racemate from dissolved racemate.

2. A process as defined by claim 1 wherein said solvent is acetone.

References Cited

FOREIGN PATENTS 667,214 Belgium.

DONALD G. DAUS, Primary Examiner

U.S. Cl. X.R.

260—289, 501.11, 501.17, 537, 593, 632